Dec. 15, 1959  D. L. CARPENTER ET AL  2,917,665
AUTOMATIC AUTOMOTIVE HEADLIGHT DIMMING CIRCUIT
Filed June 28, 1957
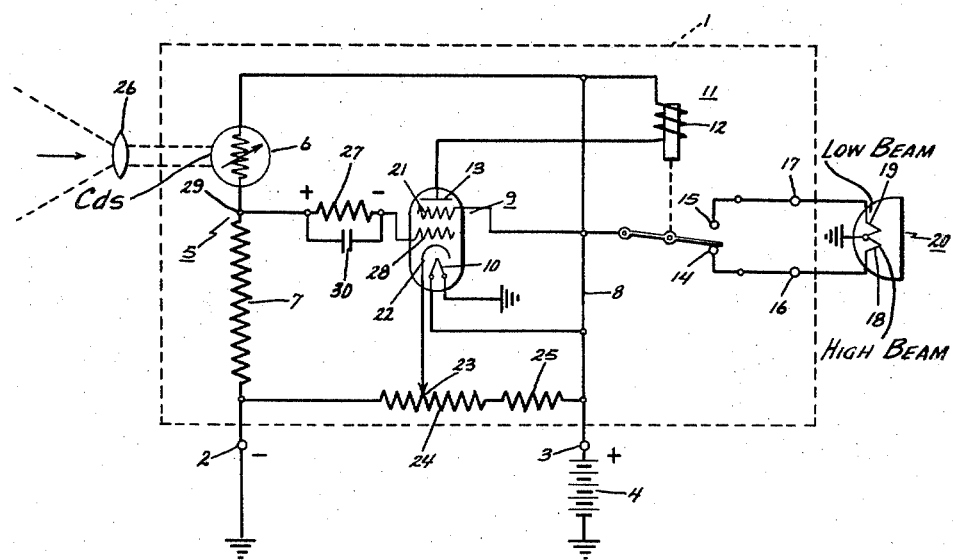
Inventors:
David L. Carpenter,
Louis E. Clements,
by George A. Guet
Attorney.

United States Patent Office 2,917,665
Patented Dec. 15, 1959

2,917,665

AUTOMATIC AUTOMOTIVE HEADLIGHT
DIMMING CIRCUIT

David L. Carpenter, Fort Wayne, Ind., and Louis E. Clements, Reseda, Calif., assignors to International Telephone and Telegraph Corporation Application June 28, 1957, Serial No. 668,644

4 Claims. (Cl. 315—83)

This invention relates to circuits for automatically dimming automotive vehicle headlamps in response to the light from the headlamps of an oncoming vehicle.

The headlamps of all automotive vehicles today are equipped with high and low beam filaments; it has for many years been a rule of courtesy in night driving (and in many states is required by law) that the headlamps be switched from the high to the low beam when an oncoming vehicle approaches in order to reduce the glare in the eyes of the other driver and thereby to increase highway safety.

While it has been conventional to provide a foot-actuated switch for switching from the high to the low beam, numerous circuits have been recently proposed for automatically dimming the headlamps as an oncoming vehicle approaches. Many of these circuits have utilized photo-multiplier tubes as the light-sensitive element on which the light from the headlamps of the oncoming vehicle impinges; however, such tubes are relatively expensive, somewhat fragile since the elements are enclosed in an evacuated envelope, and they further require a source of filament voltage. Other circuits have utilized conventional phototubes, which again have their elements enclosed in an evacuated envelope. In addition, the circuits with which the applicants are familiar have employed one or more vacuum tube amplifiers to amplify the signal provided by the photo-multiplier tube or phototube to a level sufficient to actuate a relay which performs the switching function; the use of vacuum tube amplifiers has heretofore required a high voltage power supply, such as a vibrator power supply, to furnish plate voltage much higher than the 12 volts provided by the battery of present-day vehicles.

It is therefore desirable to provide a circuit for automatically dimming automotive vehicle headlamps in response to light from an oncoming vehicle which does not require a high voltage power supply and which further is simpler and less subject to damage by vibration and shock than prior systems. Elimination of the high voltage power supply has been made possible by the introduction of vacuum tubes requiring only a 12-volt plate potential. It has further been proposed to use solid-state light sensitive elements, such as cadmium sulphide, or cadmium selenide photocells. In such cells, the resistance decreases in response to an increase in illumination, which is similar to conventional photo-multiplier tubes and phototubes. These solid-state cells are not fragile and they are characterized by their good sensitivity, i.e., a relatively small change in light impinging thereon produces a relatively large change in resistance. However, it has been found that these cells have a slow recovery characteristic, particularly when the light impinging thereon is suddenly removed; the cell has an initial rapid increase in resistance followed by a further slow increase to its original dark resistance.

It is therefore further desirable to provide a circuit of the type here discussed utilizing a low plate voltage vacuum tube amplifier and a solid-state photocell in which the system response is rapid despite the slow recovery of the cell.

It is therefore an object of our invention to provide an improved circuit for automatically dimming automotive vehicle headlamps in response to light from an oncoming vehicle.

Another object of this invention is to provide an improved automatic automotive vehicle headlamp dimming circuit which does not require a high voltage power supply.

A further object of this invention is to provide an improved automatic automotive vehicle headlamp dimming circuit utilizing a solid-state photocell in which the circuit provides rapid response despite slow recovery of the cell.

Yet another object of this invention is to provide an improved automatic automotive vehicle headlamp dimming circuit which is simpler than prior circuits.

This invention in its broader aspects provides a circuit for automatically dimming automotive vehicle headlamps in which a voltage divider circuit is connected across the vehicle battery with a solid state photocell constituting one of the elements in the circuit. A vacuum tube is provided having a relay-operating coil connecting its plate to the vehicle battery, the relay having normally closed and normally open contacts connected respectively between the battery and the high and low beam headlamp filaments; a predetermined flow of plate current energizes the relay coil sufficiently to actuate the contacts to close the normally open contacts and thus illuminate the low beam filaments and simultaneously to open the normally closed contacts, thus to extinguish the high beam filaments. The control grid of the vacuum tube is connected to a point on the voltage-dividing network so that reduction in resistance of the solid state cell in response to impingement of light thereon from an oncoming vehicle increases the control grid potential, thus to increase the plate current. In order immediately to reduce the flow of plate current sufficiently to switch "off" the low beam and simultaneously to switch "on" the high beam when the light impinging on the cell is suddenly reduced, despite the slow recovery of the cell, we have found that a resistance-capacitance time constant network connected between the control grid and the point on the voltage divider network provides a synthetic cutoff voltage on the grid which immediately reduces the plate current in response to a sudden reduction in illumination of the cell.

The above-mentioned and other features and objects of this invention and the manner of attaining them will become more apparent and the invention itself will be best understood by reference to the following description of the invention taken in conjunction with the accompanying drawing, wherein:

The single figure of the drawing schematically illustrates our improved automatic automotive headlamp dimming circuit.

Referring now to the drawing, our improved circuit, generally identified as 1, includes negative and positive battery terminals or leads 2 and 3, the positive terminal 3 being adapted to be connected to the positive side of a 12-volt vehicle battery 4. The negative side of the battery 4 and negative terminal 2 are both shown as being connected to ground, presumably the vehicle frame, in accordance with conventional practice. A voltage divider circuit 5 is connected across battery terminals 2 and 3, and comprises a solid-state photocell 6, preferably a cadmium sulphide photocell, and a resistor 7 connected in series, photocell 6 being connected to positive battery terminal 3 by a positive bus 8 and resistor 7 being connected to battery terminal 2. The solid-state photocell 6 is adapted to have the light from an oncoming vehicle impinged thereon, as by means of a suitable lens system 26.

A low voltage vacuum tube 9, such as a type 12K5 which has a 12-volt plate potential and a 12-volt filament, is provided, having one side of its filament 10 connected to positive bus 8 and the other side connected to ground, as shown. A relay 11 is provided having its operating coil 12 connecting plate 13 of tube 9 and positive bus 8. It will now clearly be seen that plate current will flow in relay coil 12 when the tube 9 conducts and thereby energize relay 11. Relay 11 has contacts 14 which are normally closed, when coil 12 has current flowing therethrough below a predetermined level, and contacts 15 which are normally open when coil 12 has less than the predetermined current therein. Flow of plate current in relay coil 12 above such predetermined level causes contacts 14 to open and contacts 15 to close. Contacts 14 and 15 respectively connect positive bus 8 and lamp terminals 16 and 17, which are respectively adapted to be connected to high and low beam filaments 18 and 19 of headlamp 20 (only one of which is shown, it being understood that at least two headlamps will conventionally be provided).

Space charge grid 21 of tube 9 is directly connected to positive bus 8 while cathode 22 is connected to movable contact 23 of potentiometer 24 which with serially connected resistor 25 comprises another voltage divider network connected across battery terminals 2 and 3. Potentiometer 24 is provided as a sensitivity adjustment control.

In order to control the flow of plate current of tube 9 responsive to the light from an oncoming vehicle impinging on solid-state cell 6, we connect a resistor 27 between control grid 28 of tube 9 and point 29 intermediate cell 6 and resistor 7 of voltage divider circuit 5. A capacitor 30 is connected across resistor 27 and forms a resistance-capacitance (RC) time constant network therewith which compensates for the slow speed of recovery of cell 6 when the light impinging thereon is suddenly reduced.

The operation of the above circuit will be described in connection with a cadmium sulphide cell 6 which has relatively high resistance with no light impinging thereon, for example on the order of 100 megohms, and a much lower resistance, on the order of one (1) megohm, when illuminated. With a 1-megohm resistor 7 and with the tube 9 being nonconductive when the bias on grid 28 exceeds −1.5 volts with respect to cathode 22, it is seen that with no light on cell 6, nearly all of the 12 volts provided by battery 4 will appear across cell 6 and point 29 will have a very low potential. Thus, if the movable contact 23 of potentiometer 24 is adjusted so that the voltage of cathode 22 is 2.5 volts, it will be seen that the control grid 28 will have a negative potential suitably in excess of −1.5 volts with respect to cathode 22 and thus the tube will be nonconductive.

When light impinges on the cell 6 and its resistance decreases to, for example, the 1-megohm level, it will be seen that the voltage divides approximately equally across the cell 6 and the resistor 7 and thus the point 29 has a potential of 6 volts. With a cathode potential of 2.5 volts, the control grid 28 is thus positive with respect to the cathode and the tube will be conductive, the control grid 28 clamping to the cathode potential. With the tube conducting, relay 11 will be energized thereby opening contacts 14 to disconnect the high beam filaments 18 and closing contacts 15 to energize the low beam filaments 19. With the control grid 28 at a potential of 2.5 volts and the point 29 at a potential of 6 volts, it will be seen that the capacitor 30 will be charged to 3.5 volts with the polarities indicated in the drawing.

If the light impinging on the cell 6 is suddenly interrupted, the resistance of the cell has an initial rapid increase followed by a much slower increase back to its original dark resistance of approximately 100-megohms. The sudden initial increase in the resistance of the cell 6 lowers the voltage of point 29 to approximately 1-volt, which is a reduction of five (5) volts from its previous condition. It will be recalled that the capacitor was previously charged to 3.5 volts and thus −2.5 volts is instantaneously applied to the control grid 28. The 3.5 volts charge on the condensor 30 is retained until the condensor 30 discharges through the resistor 27, the time depending upon the time constant used. The instananeous potential of −2.5 volts thus applied to the control grid 28 causes the tube to be nonconductive and thus the relay 11 is de-energized, thereby opening contacts 15 to extinguish the low beam filaments 19 and closing the contacts 14 to illuminate the high beam filaments 18. The values of the capacitor 30 and resistor 27 are chosen to provide a time constant so that the tube 9 will remain nonconductive until the resistance of the cell 6 is increased sufficiently to maintain the tube nonconductive. We have found that with a cadmium sulphide cell, a capacitor 30 having .2 microfarad and a resistor 27 having 1,000,000 ohms provides an adequate time constant. We have found that with an operating coil 12 of relay 11 having approximately 800 ohms, satisfactory operation is secured. The battery 4, the only source of voltage for the entire circuit, was a conventional 12-volt automotive battery.

It will now be seen that we have provided an extremely simple circuit for automatically dimming automotive vehicle headlamps in response to light from an oncoming vehicle, this circuit requiring no high voltage power supply and using a solid-state photocell with compensation being provided for the slow response of the cell.

While we have described above the principles of our invention in connection with specific apparatus, it is to be clearly understood that this description is made only by way of example and not as a limitation to the scope of our invention.

What is claimed is:

1. A circuit for automatically dimming automotive vehicle headlamps in response to light from an oncoming vehicle and having a battery, a voltage divider network connected across said battery, a vacuum tube having plate and control grid elements, a relay having an operating coil connected in series between said plate and the positive terminal of said battery, said relay having normally open and normally closed contacts respectively connected to energize the low and high beam filaments of said headlamps; characterized in that a two-terminal solid-state photocell having a slow recovery characteristic constitutes one element of said voltage divider network and has one of its terminals connected to the positive terminal of said battery, and an R.-C. time constant network is connected between said control grid and the other terminal of said photocell whereby a cutoff voltage is immediately applied to said control grid in response to removal of illumination from said photocell despite the slow recovery of said photocell.

2. A circuit for automatically dimming automotive vehicle headlamps in response to light from an oncoming vehicle comprising: a pair of positive and negative battery leads adapted to be respectively connected to the positive and negative terminals of a vehicle battery; a voltage divider circuit including a two-terminal, serially connected solid-state photocell having a slow recovery characteristic and adapted to have an oncoming beam of light impinge thereon, said voltage divider circuit being connected across said battery leads one terminal of said photocell connected adjacent said positive lead; a low plate voltage vacuum tube having plate and control grid elements, a relay having an operating coil and normally open and normally closed contacts; said relay coil being connected between said plate and said positive battery lead, said relay being actuated in response to a predetermined flow of plate current; a pair of lamp leads adapted to be respectively connected to the high and low beam filaments of said headlamps; said normally open and closed contacts being respectively connected so that said high beam filaments are normally connected to said battery and said low beam filaments are connected to said battery in response to flow of predetermined plate current in said relay coil; and a resistance-capacitance time constant network connecting said control grid to the other terminal of said photocell so that said control grid causes flow of plate current to actuate said relay responsive to predetermined illumination of said photocell and a cutoff voltage is immediately applied to said control grid to cut off said plate current and de-energize said relay coil responsive to removal of said predetermined illumination from said photocell despite the slow recovery of said photocell.

3. A circuit for automatically dimming automotive vehicle headlamps in response to light from an oncoming vehicle comprising: a pair of positive and negative battery leads adapted to be respectively connected to the positive and negative terminals of a vehicle battery; a voltage divider circuit including a two-terminal, serially connected solid-state photocell having a slow recovery characteristic and adapted to have an oncoming beam of light impinge thereon, said voltage divider circuit being connected across said battery leads with one terminal of said photocell connected adjacent said positive lead; a low plate voltage vacuum tube having plate and control grid elements, a relay having an operating coil and normally open and normally closed contacts; said relay coil being connected between said plate and said positive battery lead, said relay being actuated in response to a predetermined flow of plate current; a pair of lamp leads adapted to be respectively connected to the high and low beam filaments of said headlamps; said normally open and closed contacts being respectively connected so that said high beam filaments are normally connected to said battery and said low beam filaments are connected to said battery in response to flow of predetermined plate current in said relay coil; a resistor connecting said control grid to the other terminal of said photocell so that said control grid causes flow of plate current to energize said relay coil and actuate said contacts responsive to a predetermined illumination of said photocell; and a capacitor connected across said resistor and forming a resistance-capacitance time constant network therewith so that a synthetic cutoff voltage is immediately applied to said control grid to cut off said plate current and de-energize said relay coil responsive to removal of said predetermined illumination from said photocell despite the slow recovery of said photocell.

4. A circuit for automatically dimming automotive vehicle headlamps in response to light from an oncoming vehicle comprising: a pair of positive and negative battery leads adapted to be respectively connected to the positive and negative terminals of a vehicle battery; a cadmium sulphide photocell adapted to have an oncoming beam of light impinge thereon; a resistor serially connected with said photocell and forming a voltage divider circuit therewith, said voltage divider circuit having its photocell end connected to said positive battery lead and its other end connected to said negative battery lead; a low plate voltage vacuum tube having plate, control grid, space charge grid, cathode and heater elements; a relay having an operating coil, a set of normally open contacts and a set of normally closed contacts, said relay coil connecting said plate and said positive battery lead and being energized to actuate said contacts in response to a predetermined flow of plate current; a pair of lamp leads adapted to be respectively connected to the high and low beam filaments of said headlamps, said normally open and normally closed contacts being respectively connected so that said high beam filaments are normally connected to said battery when less than a predetermined plate current flows in said relay coil and said low beam filaments are connected to said battery responsive to actuation of said contacts; said space charge grid being connected to said positive battery leads; another voltage dividing network connected across said battery leads, said cathode being connected to a selective variable point on said other voltage dividing network; said filament of said vacuum tube being connected across said battery leads; another resistor connecting said control grid and the midpoint between said photocell and said first-named resistor so that said control grid causes flow of plate current to energize said relay coil and actuate said contacts responsive to a predetermined illumination of said photocell; and a capacitor connected across said resistor and forming a resistance-capacitance time constant network therewith so that a synthetic cutoff voltage is immediately applied to said control grid to cut off said plate current and de-energize said relay coil responsive to removal of said predetermined illumination from said photocell despite the slow recovery of said photocell.

References Cited in the file of this patent

UNITED STATES PATENTS

| | | |
|---|---|---|
| 2,150,900 | Alley | Mar. 21, 1939 |
| 2,560,748 | Silva | July 17, 1951 |
| 2,658,141 | Kurland et al. | Nov. 3, 1953 |
| 2,813,957 | Gosling | Nov. 19, 1957 |
| 2,835,847 | Guyton | May 20, 1958 |
| 2,848,651 | Byrne | Aug. 19, 1958 |
| 2,850,673 | Beckman et al. | Sept. 2, 1958 |